June 14, 1949. F. S. KRAMER 2,472,839
STEERING NOZZLE FOR JET PROPELLED AIRCRAFT
Filed June 1, 1945
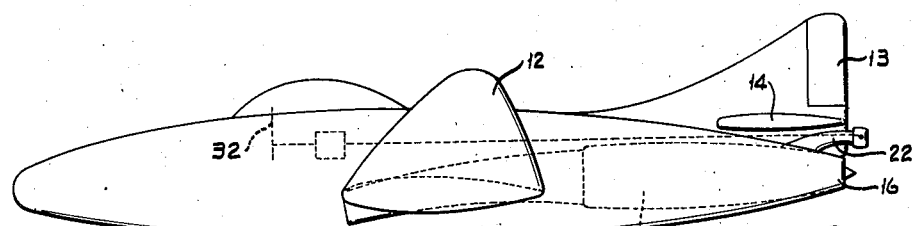
FIG. 1.
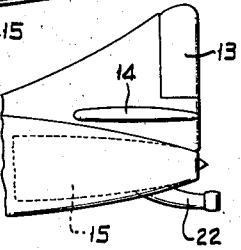
FIG. 2.
FIG. 3.
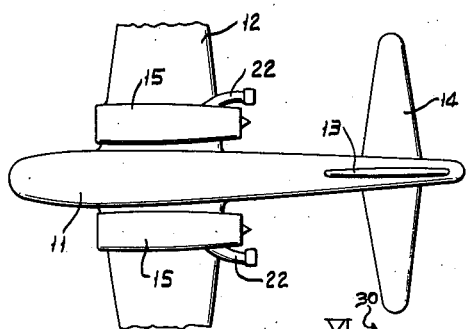
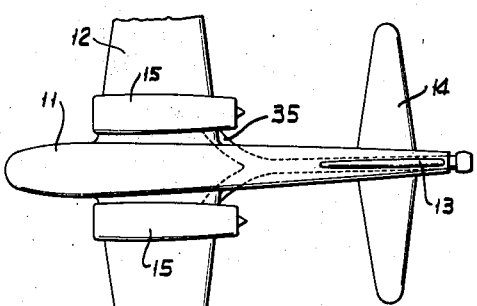
FIG. 4.
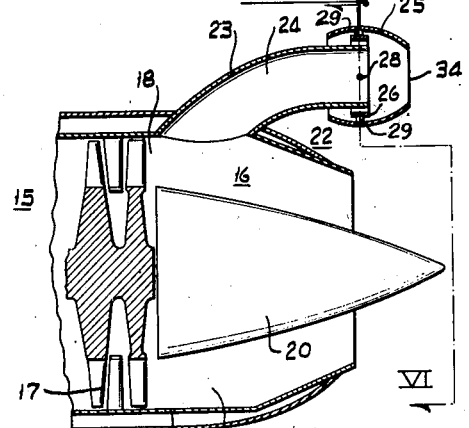
FIG. 5.
FIG. 6.
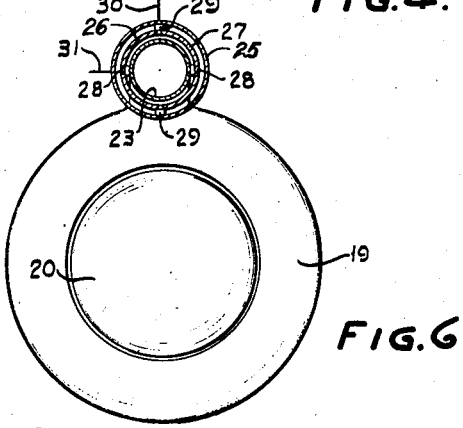
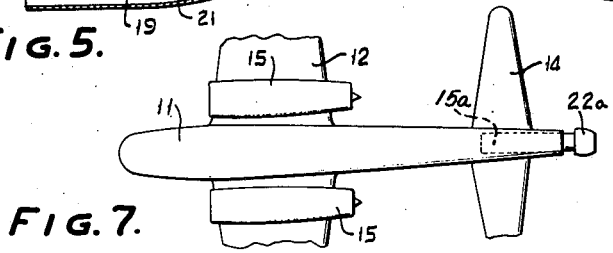
FIG. 7.
INVENTOR
FRED S. KRAMER
BY
ATTORNEY Patented June 14, 1949

2,472,839

UNITED STATES PATENT OFFICE 2,472,839

STEERING NOZZLE FOR JET-PROPELLED AIRCRAFT

Fred S. Kramer, Prospect Park, Pa., assignor to Westinghouse Electric Corporation, East Pittsburgh, Pa., a corporation of Pennsylvania Application June 1, 1945, Serial No. 597,066

1 Claim. (Cl. 60—35.55)

The invention relates to jet propulsion of craft, such as aircraft, and it has for an object to provide, in addition to the main propulsion jet, an auxiliary jet operable to exert turning effort on the craft.

In jet-propelled aircraft, the jet is arranged to exert thrust in a fore and aft direction; and, as the air speed may be quite high, near or at the speed of sound, the effort required to move rudders, elevators and ailerons, and which increases as the speed increases, may become too great for manual operation. Therefore, in accordance with the present invention, an auxiliary nozzle is disposed laterally of the main nozzle and it is arranged to discharge a jet which can be directed to exert a turning moment on the craft as desired. Preferably, the auxiliary nozzle has a discharge portion whose area is relatively much smaller than that of the main nozzle so that the discharge portion may be turned through a given angle with very much less force than would be required if such movement had to take into account the entire thrust or propulsive effort. The invention, therefore, contributes very substantial mechanical advantage so far as effort on the part of the operator is concerned.

The foregoing and other objects are effected by the invention as will be apparent from the following description and claim taken in connection with the accompanying drawing, forming a part of this application, in which:

Fig. 1 is a diagrammatic elevational view of an airplane equipped with a single main propulsion nozzle, with an auxiliary nozzle arranged thereabove and below the rudder;

Fig. 2 is a fragmentary view similar to Fig. 1, but showing the auxiliary nozzle arranged below the main nozzle;

Fig. 3 is a fragmentary view of an airplane equipped with twin jet motors each having an auxiliary nozzle disposed outwardly thereof;

Fig. 4 is a view similar to Fig. 3 except that motive fluid from the main propulsion plants is supplied by a tail pipe to the auxiliary nozzle;

Fig. 5 is a sectional view showing the relationship of main and auxiliary nozzles;

Fig. 6 is a rear end view of the main nozzle and a sectional view of the auxiliary nozzle, looking in the direction of the arrows of line VI—VI of Fig. 5; and Fig. 7 shows a modified form of auxiliary apparatus to effect steering.

In Fig. 1, there is shown an airplane, at 10, having a fuselage 11, wings 12, a vertical rudder 13, and elevators 14 forming a conventional arrangement.

A power plant, at 15, exhausts motive fluid directly into the main nozzle, at 16, or into a tail pipe supplying such a nozzle. Heat energy derived from the combustion of fuel is used internally by the plant to provide gaseous media at the pressure and temperature desired at the inlet of the propulsion nozzle and externally to provide the propulsion thrust, that is, incident to expansion of the gaseous media in the nozzle, heat energy thereof is converted into velocity which gives the propulsive thrust.

Internal operation of the plant involves the turbine 17 which drives a compressor furnishing air to combustion apparatus to provide gaseous products as motive fluid for the turbine. The turbine exhausts motive fluid directly to the inlet space 18 of the propulsion nozzle, at 16, such motive fluid then having the temperature and pressure conditions for the useful output appearing as propulsion thrust.

As shown, the nozzle, at 16, includes a casing 19 and a tail cone 20 forming an annular passage 21 whose inlet annulus is aligned with and approximates dimensionally the turbine exhaust annulus. Motive fluid at the exhaust pressure of the turbine undergoes expansion in the passage 21 with conversion of heat energy of the fluid into velocity energy thereof to provide a jet issuing at high velocity to give the propulsive thrust desired.

As the main nozzle, at 16, has its axis extending fore and aft in relation to the main axis of the airplane, it is necessary to exert a turning moment on the craft to cause the latter to change its direction laterally and vertically. If effort is applied to rudders or elevators, obviously it must take into consideration flight speeds; and, at very high flying speeds, the effort required to move the aerodynamic controls of the airplane becomes excessive.

While, in a jet-propelled plant, one might adjust the main nozzle to change the direction of thrust, a very considerable effort would be required. In accordance with the present invention, there is provided an auxiliary nozzle, at 22, utilizing motive fluid exhausting from the turbine to give propulsive thrust, but, as the flow area of the auxiliary nozzle, and, therefore, the thrust thereof, is very much less than that of the main nozzle, the direction of thrust of the auxiliary nozzle may be easily changed at very high flight speeds to obtain the turning moment desired.

The auxiliary nozzle, at 22, includes a body member 23 having a nozzle passage 24 in communication with the space at the exhaust end of the turbine, as shown in Figs. 1, 2, 3 and 5, or such nozzle passage may be supplied by an extension pipe communicating with exhaust spaces of one or more plants, as shown in Fig. 4.

The body member 23 is provided with a hood 25 which is adjustable to change the direction of thrust in relation to that of the main nozzle to provide a component giving the desired turning moment in relation to the flight path of the airplane. Furthermore, by this means the auxiliary jet may be directed to assist the main jet in taking off. Preferably, the hood is connected in a universal manner so that it may be tilted in any direction. As shown, the hood 25 encompasses the discharge end of the body portion 23 and it is connected to the latter by gimbal means 26 permitting of tilting in a universal manner by any suitable means, the gimbal means including a gimbal ring 27 connected by aligned pivots 28, 28 to the body portion 23 and by aligned pivots 29, 29 to the hood, the pivots 29, 29 being arranged at right angles to the pivots 28, 28.

Tilting moments may be exerted on the hood in any suitable manner, for example, the hood is shown as being provided with elements 30 and 31 effective about the axes of the pivots, effort for operating such elements being transmitted thereto from a control member 32 located in the cockpit of the airplane and diagrammatically indicated in Fig. 1. Control of the hood may also be effected by means of electric, pneumatic or hydraulic apparatus.

As shown, the hood encompasses the discharge portion of the body 23 in circumferentially-spaced relation and it is curved in longitudinal section to provide a flow passage which diverges and then converges. The high velocity jet issuing from the passage 24 entrains air from the atmosphere through the annular passage between the hood and the discharge end portion of the member 23, such air flowing about the gimbal means to prevent excessive temperatures of the latter on account of the motive fluid. The hood projects rearwardly of the discharge end of the body portion 23 to provide a mixing or entrainment chamber receiving both the jet issuing from the passage 24 and the entrained air. The hood is, therefore, curved in a convergent manner to give the proper direction to the entrained air, to alter the direction of the jet issuing from the passage 24, and to provide the auxiliary jet discharge area 34 adequate to handle the entrained air and the motive fluid. Aside from the advantage of cooling the gimbal means by the entrained air, the arrangement provides for augmenter action, that is, the kinetic energy of motive fluid issuing from the passage 24 is shared by the entrained air and such motive fluid with the result that, though the velocity is thereby reduced, the mass action is increased and more effective thrust is provided.

In Fig. 1, the auxiliary nozzle is arranged between the elevator 14 and the main nozzle. Fig. 2 differs from Fig. 1 in that the auxiliary nozzle is arranged below the main nozzle. In Fig. 3, the airplane is equipped with twin propulsion motors and each motor has an auxiliary nozzle, the auxiliary nozzles being disposed outwardly of the pair of motors. In Fig. 4, instead of the body portion 23 of the auxiliary nozzle being attached to the outer wall 19 of the main nozzle so as to communicate directly with the space 18 at the exhaust of the turbine and at the inlet of the main nozzle, a tail pipe arrangement 35 is provided, the tail pipe furnishing motive fluid from the turbine to the auxiliary nozzle. As shown in Fig. 4, the airplane has twin motors and the tail piece has a Siamese connection to the motors.

As so far described, motive fluid for the auxiliary jet is exhausted from the turbine of the main jet plant; however, in its broader aspects, this is not essential to the invention, for, in Fig. 7, there is shown a modified form where the auxiliary nozzle, at 22a, is a self-contained unit independent of the main nozzles, that is, the auxiliary nozzle at 22a, handles motive fluid supplied thereto from its jet engine 15a which is separate from the main jet engine or engines.

From the foregoing, it will be apparent that I have provided an auxiliary jet capable of furnishing only a minor part of the total propulsive thrust with the result it may be readily manipulated at high flight speeds to effect change in direction. In addition, the auxiliary jet is useful to give added propulsive effort when taking off.

While I have shown the invention in several forms, it will be obvious to those skilled in the art that it is not so limited, but is susceptible of various other changes and modifications without departing from the spirit thereof.

What is claimed is:

In apparatus for propelling an airplane, a main nozzle fixedly mounted relative to the airplane with its axis extending in the direction of flight and arranged to expand motive fluid exhausting from a turbine and to discharge such motive fluid as a high velocity jet for propelling the airplane; an auxiliary nozzle for expanding motive fluid to provide an auxiliary propulsion jet; said auxiliary nozzle having a discharge flow area which is relatively much smaller than that of the main nozzle and being arranged to discharge motive fluid to one side of the latter; said auxiliary nozzle including a body portion fixed in relation to the airplane, a hood encompassing the discharge end of the body portion and extending rearwardly of the latter, and gimbal means for supporting the hood on the body portion; said hood being spaced circumferentially about the body portion to provide an annular passage which entrains air from the atmosphere to flow over the gimbal means and join motive fluid issuing from the discharge end of the body portion to form the jet discharging from the hood; and means for effecting movement of the hood in a universal manner to change the direction of thrust of the auxiliary jet in relation to that of the main jet to turn the airplane.

FRED S. KRAMER.

REFERENCES CITED

The following references are of record in the file of this patent:

UNITED STATES PATENTS

| Number | Name | Date |
|---|---|---|
| 179,266 | Chapman | June 27, 1876 |
| 1,642,752 | Landon | Sept. 20, 1927 |
| 2,280,835 | Lysholm | Apr. 28, 1942 |

FOREIGN PATENTS

| Number | Country | Date |
|---|---|---|
| 8,792 | Great Britain | Apr. 6, 1897 |